United States Patent
Heshmati et al.

(10) Patent No.: US 9,961,506 B2
(45) Date of Patent: May 1, 2018

(54) SYSTEMS AND METHODS FOR DETERMINING POSITION USING A GEOFEATURE

(71) Applicant: InvenSense, Incorporated, San Jose, CA (US)

(72) Inventors: Ardalan Heshmati, Saratoga, CA (US); Rahul Bakshi, San Jose, CA (US)

(73) Assignee: InvenSense, Inc., San Jose, CA (US)

(*) Notice: Subject to any disclaimer, the term of this patent is extended or adjusted under 35 U.S.C. 154(b) by 0 days. days.

(21) Appl. No.: 14/282,589

(22) Filed: May 20, 2014

(65) Prior Publication Data

US 2015/0341756 A1    Nov. 26, 2015

(51) Int. Cl.
  *H04W 4/04*  (2009.01)
  *H04W 4/02*  (2018.01)
  *H04W 4/00*  (2018.01)

(52) U.S. Cl.
  CPC ............ *H04W 4/043* (2013.01); *H04W 4/006* (2013.01); *H04W 4/028* (2013.01)

(58) Field of Classification Search
  CPC ..... H04N 19/527; H04N 5/145; H04W 64/00; H04W 4/02; H04W 4/021; H04W 4/025
  USPC ........................................................ 455/456
  See application file for complete search history.

(56) References Cited

U.S. PATENT DOCUMENTS

| 2014/0011518 A1* | 1/2014 | Valaee et al. ............ 455/456.1 |
| 2014/0045541 A1* | 2/2014 | Moshfeghi ............ H04W 84/00 455/500 |
| 2014/0323160 A1* | 10/2014 | Venkatraman et al. ... 455/456.6 |

* cited by examiner

*Primary Examiner* — Kabir A Timory
(74) *Attorney, Agent, or Firm* — Bay Area Technology Law Group

(57) ABSTRACT

Systems and methods are disclosed for refining a coarse location determination by detecting patterns of motion sensor data that may be associated with predetermined locations. One or more geofeatures may be identified that cause a mobile device associated with a user to detect a distinguishable pattern of sensor data when the user interacts with the object. Accordingly, a coarse location may be refined using information associated with the geofeature, such as the location of the geofeature.

2 Claims, 3 Drawing Sheets

SYSTEMS AND METHODS FOR DETERMINING POSITION USING A GEOFEATURE

FIELD OF THE PRESENT DISCLOSURE

This disclosure generally relates to techniques for determining the position of a mobile device and more particularly to refining a coarse location using information associated with a geofeature.

BACKGROUND

Particularly in the context of mobile devices, it is desirable to provide location awareness capabilities. An expanding variety of technologies have been developed to provide a device with information about its location, allowing it to selectively deliver information based on its location context or to otherwise adapt its operation. Common examples include navigation aids that may be used to guide a user to a desired destination, social networking applications that may inform the user about others that may be in proximity, targeted advertising schemes that may provide information relative to the user's location or tracking utilities that may provide real time information about a user's whereabouts.

In some cases, a mobile device may have position determination capabilities in the form of a Global Positioning Satellite (GPS) system that, under the proper conditions, may provide precise information about the geographic location of the device. However, GPS performance may be subject to degradation when visibility of the satellites is reduced. For example, use of GPS in an indoor environment may lengthen the time needed to obtain the necessary fix on the satellites or may prevent it entirely. Alternative means for determining the position of a mobile device that are more amenable to indoor applications may include wireless local area network (WLAN) ranging, positioning based on cellular reception, dead reckoning techniques and others. However, these alternate means may not offer the same precision as available through GPS systems. Accordingly, there is a need for systems and methods to refine location determinations to improve accuracy or otherwise augment position information regarding a mobile device that may be used indoors as well as outdoors.

Furthermore, not all mobile devices may be equipped with GPS systems, yet such devices may still benefit from accurate location awareness. Still further, despite the precision offered by GPS systems, it may still be desirable to provide additional sources of position information to improve GPS performance, such as by enhancing heading information or decreasing the time to first fix. As such it would be desirable to refine position determinations, regardless of the technique used.

This disclosure satisfies these and other needs as described in the following materials.

SUMMARY

As will be described in detail below, this disclosure includes a method for refining position information for a mobile sensor device associated with a user and may involve obtaining a coarse location of the device, matching a pattern of sensor data detected by the device with a signature that is correlated with a first class of geofeatures, identifying a first geofeature based, at least in part, on proximity to the coarse position for the device, wherein the first geofeature is a member of the first class of geofeatures; and refining position information for the device using information associated with the first geofeature.

In one aspect, refining the position of the device may include updating the coarse location. Alternatively or in addition, a heading or a direction of movement of the user may be determined. Further, a subsequent position determination for the device may be seeded using the refined position information.

In one aspect, a sensor of the device may be calibrated using a characteristic of the first geofeature.

In one aspect, a plurality of geofeatures having the signature may be identified, such that the plurality of geofeatures are members of the first class of geofeatures, and the first geofeature may be selected using previously determined position information for the device. Further, patterns of sensor data detected by the device may be sequentially matched with a plurality of signatures that are correlated with a plurality of geofeatures, wherein the plurality of geofeatures are known to be related.

In one aspect, the method may include matching the pattern of sensor data remotely.

In one aspect, the signature may be updated using sensor data detected by the device. Further, the signature may be established by aggregating sensor data detected by a plurality of mobile sensor devices. A map may be populated with a geofeature by associating a known object with a geofeature class. Alternatively or in addition, a map may be populated with a geofeature by associating a pattern of sensor data detected by the device with a determined location.

In one aspect, information, such as advertising or information relevant to a specific location, may be delivered to the device using the refined position information.

In one aspect, the first geofeature may be identified by determining a possible range of positions for the user from an uncertainty associated with the coarse location such that the first geofeature is within the possible range.

In one aspect, the sensor data may be detected using at least one of an accelerometer, a gyroscope, a magnetometer, a thermometer, a hygrometer, a barometer, a microphone, a camera, a photosensor and a proximity sensor.

This disclosure also includes a system for refining position information for a mobile sensor device associated with a user. The system may include a location manager configured to obtain a coarse location of the device and a detection manager that may match a pattern of sensor data detected by the device with a signature that is correlated with a first class of geofeatures and identify a first geofeature based, at least in part, on proximity to the coarse position for the device, wherein the first geofeature is a member of the first class of geofeatures, such that the location manager refines position information for the device using information associated with the first geofeature.

In one aspect, the location manager may refine the position of the device by updating the coarse location. Alternatively or in addition, the location manager may determine a direction of movement of the user. Further, the location manager may seed a subsequent position determination for the device using the refined position information.

In one aspect, a calibration manager may calibrate a sensor of the device may be calibrated using a characteristic of the first geofeature.

In one aspect, the detection manager may identify a plurality of geofeatures having the signature, such that the plurality of geofeatures are members of the first class of geofeatures, and the detection manager may select the first geofeature using previously determined position information for the device. Further, the detection manager may sequentially match patterns of sensor data detected by the device with a plurality of signatures that are correlated with a plurality of geofeatures, wherein the plurality of geofeatures are known to be related.

In one aspect, matching the pattern of sensor data may be performed remotely and communicated to the device.

In one aspect, the detection manager may update the signature using sensor data detected by the device. Further, the signature may be established by aggregating sensor data detected by a plurality of mobile sensor devices. A map may be populated with a geofeature by associating a known object with a geofeature class. Alternatively or in addition, a map may be populated with a geofeature by associating a pattern of sensor data detected by the device with a determined location.

In one aspect, the device may receive information, such as advertising or information relevant to a specific location, depending on the refined position information.

In one aspect, the detection manager may identify the first geofeature by determining a possible range of positions for the user from an uncertainty associated with the coarse location such that the first geofeature is within the possible range.

In one aspect, the device may have at least one sensor, including an accelerometer, a gyroscope, a magnetometer, a thermometer, a hygrometer, a barometer, a microphone, a camera, a photosensor and a proximity sensor.

DETAILED DESCRIPTION

Figure 1:
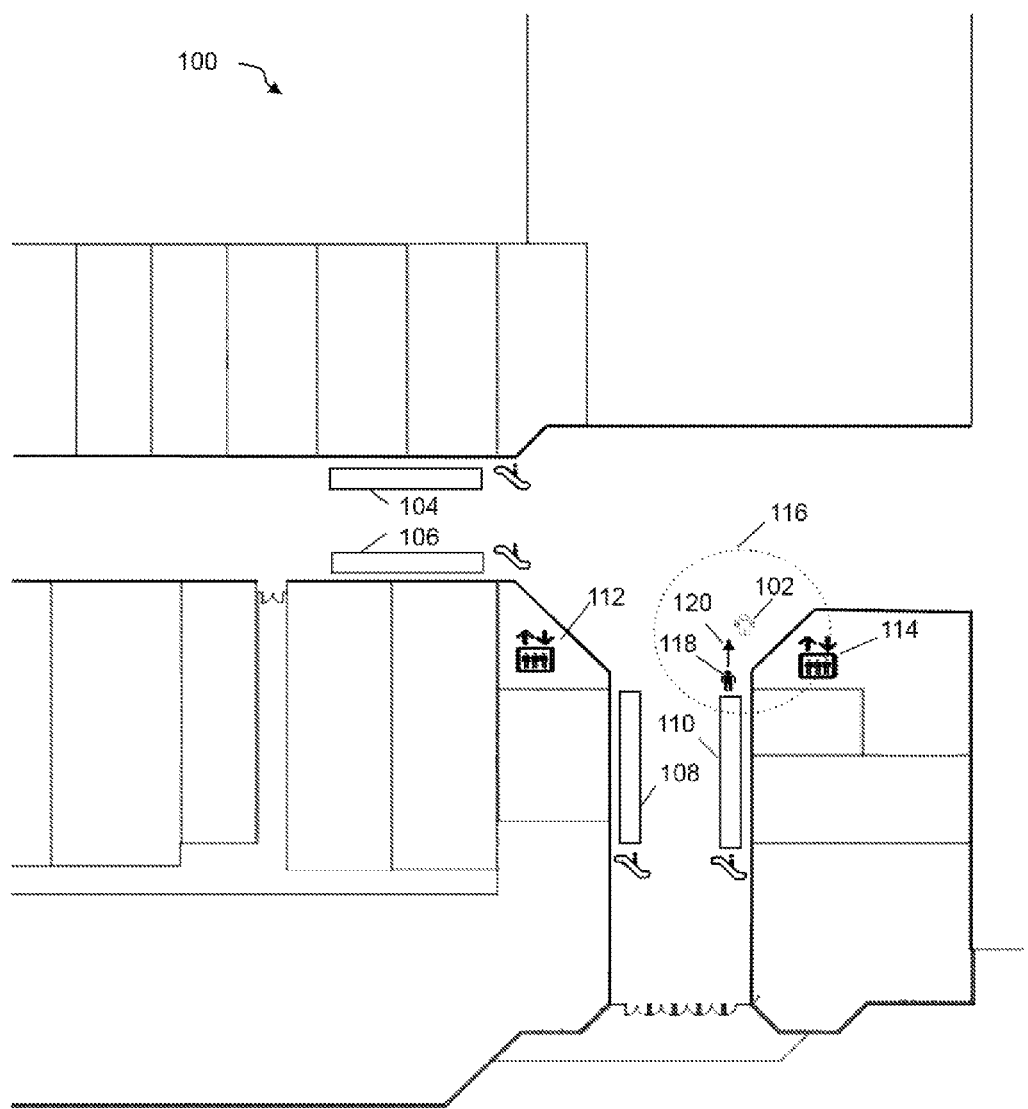
FIG. 1 is a schematic map showing a coarse location and refined position information derived from a geofeature according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The development of microelectromechanical systems (MEMS) has enabled the incorporation of a wide variety of sensors into mobile devices, such as cell phones, laptops, tablets, gaming devices and other portable, electronic devices. Non-limiting examples of sensors include motion sensors, such as an accelerometer, a gyroscope and a magnetometer. In many situations, operations known as sensor fusion may involve combining data obtained from multiple sensors to improve accuracy and usefulness of the sensor data, such as by refining orientation information or characterizing a bias that may be present in a given sensor. For example, many motion tracking systems combine data from a gyroscope, an accelerometer and a magnetometer.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a motion tracking module also referred to as Motion Processing Unit (MPU) that includes at least one sensor in addition to electronic circuits. The sensor, such as a gyroscope, a compass, a magnetometer, an accelerometer, a microphone, a pressure sensor, a proximity sensor, or an ambient light sensor, among others known in the art, are contemplated. Some embodiments include accelerometer, gyroscope, and magnetometer, which each provide a measurement along three axes that are orthogonal relative to each other referred to as a 9-axis device. Other embodiments may not include all the sensors or may provide measurements along one or more axes. The sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data refers to processed raw data. Processing may include applying a sensor fusion algorithm or applying any other algorithm. In the case of a sensor fusion algorithm, data from one or more sensors may be combined to provide an orientation of the device. For example, data from a 3-axis gyroscope and a 3-axis accelerometer may be combined in a 6-axis sensor fusion and data from a 3-axis gyroscope, a 3-axis accelerometer and a 3-axis magnetometer may be combined in a 9-axis sensor fusion. In the described embodiments, an MPU may include processors, memory, control logic and sensors among structures.

This disclosure provides techniques for refining position information for a mobile device, such as a coarse location determined using any method. Patterns of sensor data may be detected that correspond to predetermined locations. In one aspect, one or more geofeatures may be identified that are known to be in a suitable range of proximity to a mobile device. As used herein, a "geofeature" is any object having a known location that causes a mobile device associated with a user to detect a distinguishable pattern of sensor data when the user interacts with the object. The user may carry the mobile device or the device may be configured to be wearable. In the embodiments discussed below, the user is a person but these techniques may be extended to other types of users, such as animals, robots or vehicles.

Although a particular geofeature may have a unique pattern of data, or signature, associated with it, in many cases the signature may correspond to a specific class of geofeature having members that share common attributes. A geofeature may be an object that directly moves the user, and therefore, a mobile device associated with the user, in a characteristic motion. Examples include elevators, escalators, moving walkways and the like. Alternatively, the geofeature may constrain the user into a characteristic pattern of motion, such as a hallway, a stairway, a tunnel or similar constructs. Still further, a geofeature may be an object that causes the user to interact with it in a characteristic pattern, such as a user inputting data at a terminal or automatic teller machine.

Accordingly, a coarse location determination for a mobile device may be made using any suitable positioning technique, including GPS, WiFi positioning, cellular tower positioning, Bluetooth™ positioning beacons, dead reckoning or any other similar method. That coarse location then may be refined when the mobile device detects a pattern of sensor data corresponding to a signature that is correlated with a geofeature by updating the location determination with information associated with the geofeature. In one aspect, the geofeature may be a class of one and have a sufficiently unique signature for the relevant area, such that the coarse location determination for the device is refined to reflect the known information associated with the geofeature. In another aspect, the geofeature may be a member of a class of geofeatures. Any members of that class in the vicinity may be identified as candidates and one may be selected based on relative proximity, previous heading information or any other suitable criteria. After selecting the target geofeature, the coarse location determination for the device may be refined by updating it with position information associated with the selected geofeature. As used herein, the term "position information" means any information concerning the absolute or relative location of a device and may further include absolute or relative movement and/or orientation of the device, such as heading information.

To help illustrate aspects of this disclosure, a schematic map of an indoor shopping mall 100 is depicted in FIG. 1. The user may have a mobile device configured to utilize the position information refinement techniques according to an embodiment of this disclosure and, as such, the device may have one or more sensors, including motion sensors such as gyroscopes, accelerometers and magnetometers, and may detect data signatures using the one or more sensors that may be correlated with a geofeature or a class of geofeature. A coarse location 102 of the user may be determined using any suitable technique, including those referenced above. In the example represented by this figure, there are four known geofeatures in the escalator class in the vicinity, escalators 104, 106, 108 and 110, and there are two known geofeatures in the elevator class, elevators 112 and 114. Correspondingly, when the device detects a signature characteristic of an escalator, escalators 104, 106, 108 and 110 may be candidates for refining the coarse location and elevators 112 and 114 may be rejected as not belonging to the recognized class of geofeature.

As noted, selection among any candidate geofeatures may be performed using any suitable criteria. For example, one criterion may be proximity of the geofeature to the coarse location determination. As schematically shown, there may be a predicted range of uncertainty 116 associated with coarse location 102. Any suitable factor may be used when determining the predicted range of uncertainty. In one aspect, the range of uncertainty may reflect the degree of precision of the technique used to establish the coarse location, resulting in a narrower range for a more accurate technique, such as GPS, and a wider range for a less accurate technique, such as cellular tower positioning. Other factors may be used alone or in conjunction as desired. In one aspect, the range of uncertainty may be adjusted depending on the degree to which the detected sensor data matches the signature for the geofeature. In another aspect, the range of uncertainty may be adjusted depending on how distinguishable the detected signature is from signatures associated with other classes of geofeatures. As shown in FIG. 1, one candidate member for the escalator class, escalator 110, is within the range of uncertainty 116. Accordingly, coarse location 102 may be refined using information associated with a characteristic of the corresponding geofeature. For example, escalator 110 may have a specific, known exit point allowing coarse location 102 to be refined to reflect known position 118.

Alternatively or in addition, factors other than proximity may be used to select a matching geofeature from a pool of candidates. Heading or other context information may be used to predict likely travel paths for the user and, in turn, a geofeature may be selected based on its position relative to the predicted path. Further, the devices sensors may detect a sequence of signatures corresponding to multiple geofeatures. As such, selection among a pool of candidates may be predicated on the relative position of a given geofeature to other geofeatures that would result in the detected sequence. For example, a given stairwell may have multiple flights of stairs, such that a device associated with a user traveling between more than one floor would sequentially detect multiple signatures, one corresponding to each flight.

In addition to updating location, the position information refined by correlating detected sensor data with a geofeature signature may also include a movement vector in the form of a heading and may include a distance, velocity or acceleration component. For example, the position information for the mobile device of a user exiting escalator 110 may be assumed to have a heading 120 that is in line with the escalator and may be assumed to have a velocity associated with walking. This refined position information may be used to seed subsequent location determinations, such as by using dead reckoning techniques as known to those of skill in the art.

In another aspect, the refined position information may be used for any other suitable purpose, such as sensor calibration. For example, when a heading may be associated with a geofeature, such as escalator 110 as described above, it may be used for a magnetometer calibration routine for a magnetometer. As another example, a geofeature such as an elevator may have a known acceleration profile that may be used to calibrate an accelerometer. In general, any suitable aspect of the pattern of sensor data characteristic of the geofeature may be used as a reference for calibrating a sensor.

In a further aspect, the sensor data signature for a geofeature or class of geofeature may be determined in any suitable manner. For example, the signature may be obtained from sensor data recorded by a device associated with a user interacting with the geofeature. In another aspect, the signature may be calculated using known characteristics of the geofeature, such height, length, altitude change, operating speed or others. In yet another aspect, the signature may be derived from data associated with other similar geofeatures. Still further, a determined signature may be updated or improved with new or additional sensor data. For example, sensor data corresponding to a given geofeature may be collected from any number of users to enhance the characterization.

Correspondingly, any suitable map may be populated with geofeatures to facilitate correlating a detected signature with a geofeature having a known location. In one aspect, structures already included in a map may belong to one or more classes of geofeatures. For example, existing maps may have already identified features such as stairways, escalators or elevators belonging to an already characterized class of geofeature, enabling such objects to be utilized as geofeatures according to the techniques of this disclosure. In another aspect, geofeatures may be directly determined and added to a map, such as through a site survey designed to identify qualifying objects. In yet another aspect, a crowd sourcing strategy may be used to aggregate or combine sensor data from multiple devices to identify reoccurring patterns of data that may be associated with an object in a specific location. In turn, an appropriate signature for that object may be determined and utilized as a geofeature. Alternatively or in addition, crowd sourcing strategies may also be used to validate or improve an already determined geofeature.

Figure 2:
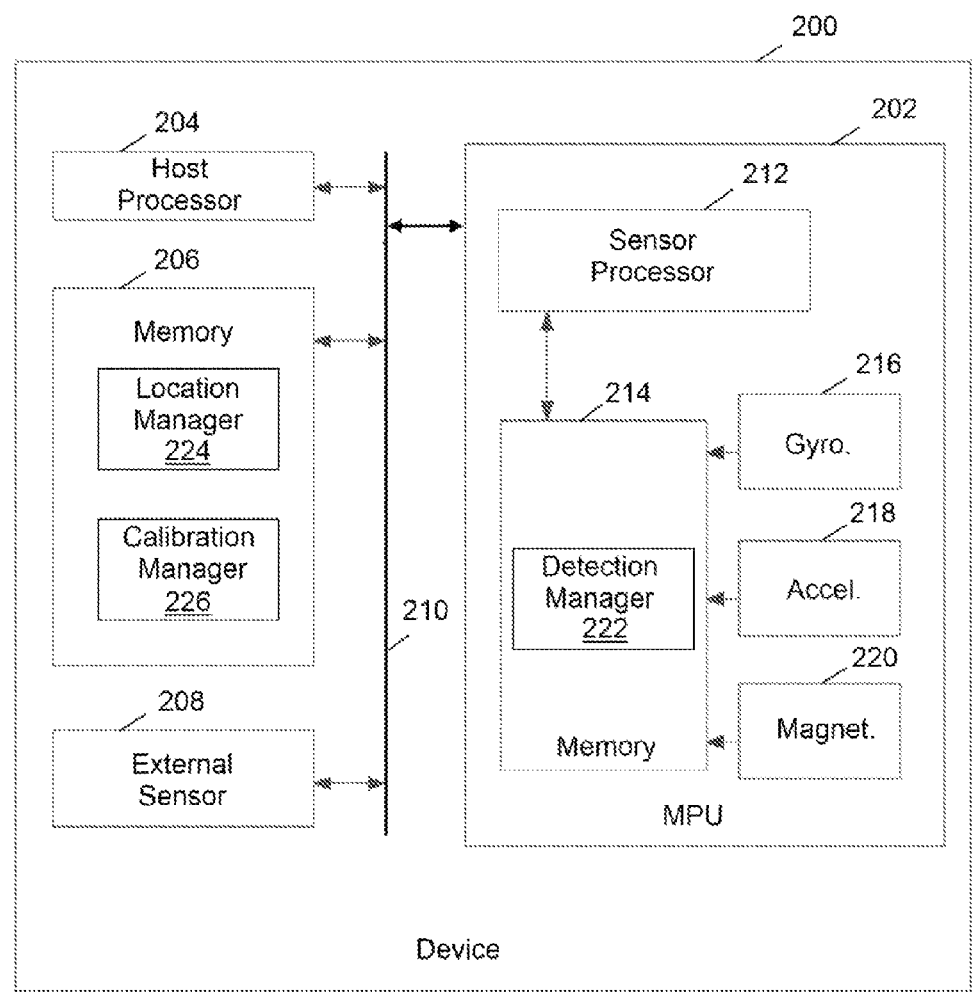
FIG. 2 is a schematic diagram of device configured to refine position information according to an embodiment.

Details regarding one embodiment of a mobile electronic device 200 including features of this disclosure are depicted as high level schematic blocks in FIG. 2. As will be appreciated, device 200 may be implemented as a device or apparatus, such as a handheld device that can be moved in space by a user and its motion and/or orientation in space therefore sensed. For example, such a handheld device may be a mobile phone (e.g., cellular phone, a phone running on a local network, or any other telephone handset), tablet, wearable device, including a health and fitness band, glasses, or the like, personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices.

As desired, device 200 may be self-contained device or may function in conjunction with another portable device or a non-portable device such as a desktop computer, electronic tabletop device, server computer, etc. which can communicate with the device 200, e.g., via network connections. The device may be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections. Therefore, although the primary embodiments discussed in this disclosure are in the context of a self-contained device, any of the functions described as being performed by device 200 may be implemented in a plurality of devices as desired and depending on the relative capabilities of the respective devices. As an example, a wearable device may have one or more sensors that output data to another device, such as a smart phone or tablet, which may be used to perform any or all of the other functions. In yet another aspect, maintaining a database of geofeatures and their locations as well as the signature matching process may be performed locally by device 200 or a companion device, or remotely by a server. Thus, any combination of the involved functions may be distributed among as many local and remote devices as desired. As such, the term "system" may include either a self-contained device or a combination of devices acting in concert.

As shown, device 200 includes MPU 202, host processor 204, host memory 206, and may include one or more sensors, such as external sensor 208. Host processor 204 may be configured to perform the various computations and operations involved with the general function of device 200. Host processor 204 may be coupled to MPU 202 through bus 210, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent. Host memory 206 may include programs, drivers or other data that utilize information provided by MPU 202. Exemplary details regarding suitable configurations of host processor 204 and MPU 202 may be found in co-pending, commonly owned U.S. patent application Ser. No. 12/106,921, filed Apr. 21, 2008, which is hereby incorporated by reference in its entirety.

In this embodiment, MPU 202 is shown to include sensor processor 212, memory 214 and gyroscope 216, accelerometer 218 and magnetometer 220. Any or all of gyroscope 216, accelerometer 218 and magnetometer 216 may be implemented as a MEMS-based inertial sensor configured to provide raw data output measured along three orthogonal axes or any equivalent structure. Memory 214 may store algorithms, routines or other instructions for processing data output by gyroscope 216, accelerometer 218 and magnetometer 216, such as detection manager 222 described in detail below. One or more additional internal sensors may be integrated into MPU 202 as desired. If provided, external sensor 208 and/or an additional internal sensor may include one or more sensors, such as accelerometers, gyroscopes, magnetometers, pressure sensors, hygrometers, barometers, microphones, photo sensors, cameras, proximity sensors and temperature sensors among others.

As used herein, an internal sensor refers to a sensor implemented using the MEMS techniques described above for integration with MPU 202 into a single chip. Similarly, an external sensor as used herein refers to a sensor carried on-board device 200 that is not integrated into MPU 202. Further, even though embodiments are described in the context of one or more of gyroscope 216, accelerometer 218 and magnetometer 216 being integrated into MPU 202, these techniques may be applied to non-integrated sensors, such as external sensor 208 and detection manager 222 may be implemented using instructions stored in any available memory resource, such as host memory 206, that may be executed using any available processor, such as host processor 204. Still further, the functionality performed by the detection manager 222 may be implemented using any combination of hardware, firmware and software and one or more functions described below as being performed by detection manager 222 may be performed remotely, as desired. For example, in one aspect, a remote server may maintain and update signatures associated with different classes of geofeatures. The remote server may also be configured to correlate known geofeatures with information in a database that may be used to refine position information for a mobile device, such as by providing the locations of the geofeatures and/or other characteristics. As such, device 200 may upload detected patterns of sensor data to be matched remotely by the server. Alternatively or in addition, device 200 may periodically download signatures and/or information associated with known geofeatures so that matching may be performed locally.

As will be appreciated, host processor 204 and/or sensor processor 212 may be one or more microprocessors, central processing units (CPUs), or other processors which run software programs for device 200 or for other applications related to the functionality of device 200. For example, different software application programs such as menu navigation software, games, camera function control, navigation software, and phone or a wide variety of other software and functional interfaces can be provided. In some embodiments, multiple different applications can be provided on a single device 200, and in some of those embodiments, multiple applications can run simultaneously on the device 200. Multiple layers of software can be provided on a computer readable medium such as electronic memory or other storage medium such as hard disk, optical disk, flash drive, etc., for use with host processor 204 and sensor processor 212. For example, an operating system layer can be provided for device 200 to control and manage system resources in real time, enable functions of application software and other layers, and interface application programs with other software and functions of device 200. In some embodiments, one or more motion algorithm layers may provide motion algorithms for lower-level processing of raw sensor data provided from internal or external sensors. Further, a sensor device driver layer may provide a software interface to the hardware sensors of device 200. Some or all of these layers can be provided in host memory 206 for access by host processor 204, in memory 214 for access by sensor processor 212, or in any other suitable architecture.

For example, device 200 may also include a location manager 224 implemented in memory 206 as shown, or any other suitable location or implementation, and may be configured to provide a coarse location determination for device 200. As described above, location manager 224 may employ any technique for determining coarse location, including GPS, WiFi positioning, cellular tower positioning, Bluetooth™ positioning beacons, dead reckoning or any other similar method. Location manager 224 may also be configured to refine position information for device 200 upon selection of a target geofeature by detection manager 222, for example, by using information that may be associated with the target geofeature.

Further, in the embodiment shown, device 200 also includes a calibration manager 226 that may be configured to use information associated with the target geofeature to perform a calibration of one or more sensors as described above.

According to the techniques of this disclosure, detection manager 222 may be configured to receive raw or processed data output by one or more external sensors or internal sensors. Detection manager 222 may then match a pattern of data output by the sensor or sensors with signatures corresponding to classes of geofeatures. Detection manager 222 may interface with location manager 224 to refine the coarse location or otherwise update position information for device 200. Location manager 224 may provide the coarse location using any technique as described above. Detection manager 222 may identify candidate geofeatures by matching the pattern of sensor data to a class of geofeatures. Detection manager 222 may then select a target geofeature from a pool of candidate geofeatures belonging to the class of the matched pattern. In turn, location manager 224 may refine the coarse position with position information associated with the selected geofeature.

Figure 3:
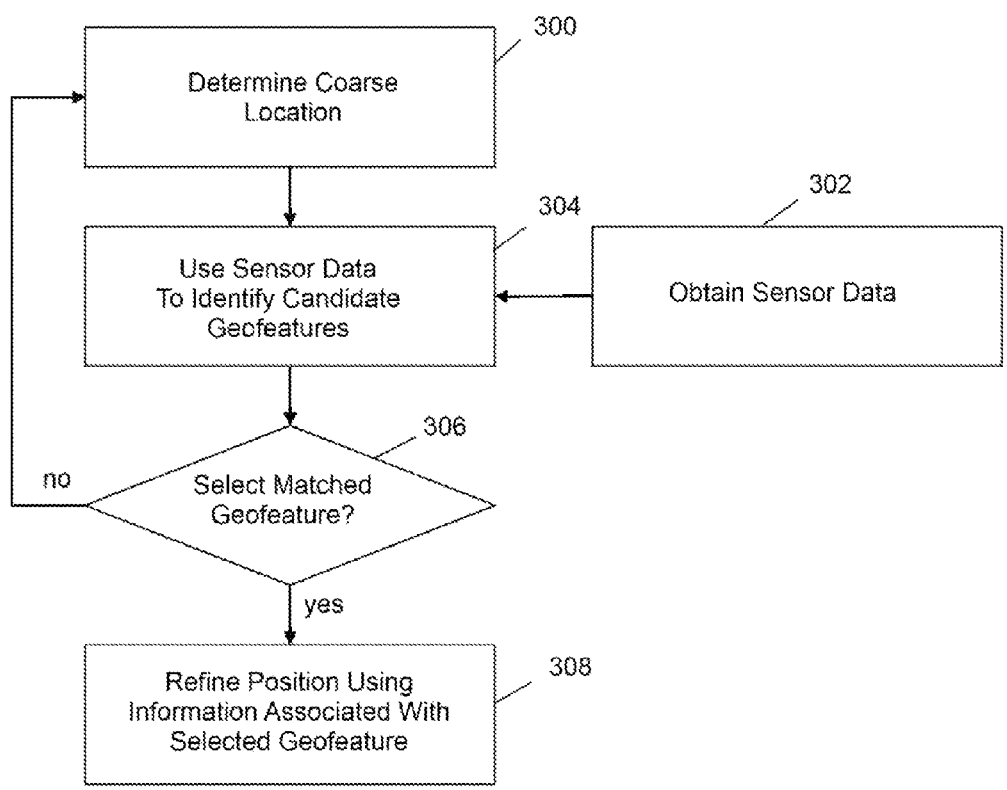
FIG. 3 is a flowchart showing a routine for refining position information according to an embodiment.

Further aspects of this disclosure are illustrated with respect to the flowchart shown in FIG. 3, which represents matching a pattern of data detected by device 200 to a signature associated with a geofeature and refining position information for device 200 based, at least in part, on the geofeature. Beginning with 300, location manager 224 may determine a coarse location for device 200 using any suitable positioning technology. Detection manager 222 may also receive data detected by internal or external sensors of device 200 as indicated by 302. Detection manager may then identify candidate geofeatures in the vicinity belonging to a class that matches a pattern of detected data in 304. The routine may branch at 306, such that if detection manager 222 is able to select a target geofeature from the pool of candidates with sufficient confidence, such as by using any of the criteria described above, the routine may flow to 308 and detection manager may refine the position information for device, such as by updating the coarse location of location manager 224. If not, the routine may return to 300 to determine if a new coarse position is available and to 302 to monitor the detected sensor data for a pattern that matches a signature associated with any known classes of geofeatures.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for refining position information for a mobile sensor device associated with a user comprising:

obtaining a coarse location of the mobile sensor device;
matching a pattern of sensor data detected by the mobile sensor device with a signature that is correlated with a first class of geofeatures, wherein a geofeature is any object having a known location that causes a mobile device associated with a user to detect a distinguishable pattern of sensor data when the user interacts with the object and wherein the sensor data comprises motion sensor data;
identifying a first geofeature based, at least in part, on proximity to the coarse location for the mobile sensor device, wherein the first geofeature is a member of the first class of geofeatures;
refining position information for the mobile sensor device using information associated with the first geofeature;
identifying a plurality of geofeatures having the signature, such that the plurality of geofeatures are members of the first class of geofeatures;
selecting the first geofeature using previously determined position information for the mobile sensor device; and
sequentially matching patterns of sensor data detected by the mobile sensor device with a plurality of signatures that are correlated with a plurality of geofeatures, wherein the plurality of geofeatures are known to be related.

2. A system for refining position information for a mobile sensor device associated with a user comprising:
a location manager configured to obtain a coarse location of the mobile sensor device; and
a detection manager configured to:
match a pattern of sensor data detected by the mobile sensor device with a signature that is correlated with a first class of geofeatures, wherein a geofeature is any object having a known location that causes a mobile device associated with a user to detect a distinguishable pattern of sensor data when the user interacts with the object and wherein the sensor data comprises motion sensor data, and
identify a first geofeature based, at least in part, on proximity to the coarse location for the mobile sensor device, wherein the first geofeature is a member of the first class of geofeatures;
wherein the location manager is further configured to refine position information for the mobile sensor device using information associated with the first geofeature and wherein the detection manager is further configured to:
identify a plurality of geofeatures having the signature, such that the plurality of geofeatures are members of the first class of geofeatures;
select the first geofeature using previously determined position information for the mobile sensor device; and
sequentially match patterns of sensor data detected by the mobile sensor device with a plurality of signatures that are correlated with a plurality of geofeatures, wherein the plurality of geofeatures are known to be related.

* * * * *